Jan. 31, 1967  J. J. DALGLISH ET AL  3,300,866
COMPASS AND INCLINOMETER

Filed April 23, 1964  2 Sheets-Sheet 1

INVENTORS
JAMES J. DALGLISH
EARL W. LAGER
BY
ATTORNEY

Jan. 31, 1967   J. J. DALGLISH ET AL   3,300,866
COMPASS AND INCLINOMETER

Filed April 23, 1964   2 Sheets-Sheet 2

INVENTORS
JAMES J. DALGLISH
EARL W. LAGER
BY
ATTORNEY

United States Patent Office 3,300,866
Patented Jan. 31, 1967

3,300,866
COMPASS AND INCLINOMETER
James J. Dalglish, 1839 Woodland Ave., St. Paul, Minn.
55112, and Earl W. Lager, 1267 Hewitt Ave., St. Paul,
Minn. 55104
Filed Apr. 23, 1964, Ser. No. 362,086
3 Claims. (Cl. 33—205.5)

This invention relates to a compass and inclinometer to indicate the compass direction and angular inclination of a bore hole having means whereby the compass direction and angular inclination may be photographically recorded.

Particularly in making bores of considerable depth it is desirable to determine frequently the angular inclination of the bore from the vertical as well as the compass direction of the bore. In the past, various means have been devised to record compass direction or to record angular inclination particularly by some means whereby the indicators were locked in a fixed position at the time the recording indication was to be taken, and the instruments were thereupon brought to the surface for reading. To some extent, various attempts have been made to introduce electronic equipment into the field without sufficient popularity due to the difficulty in maintenance, expense, and training required to operate the gear. A further difficulty has been prevalent in that most of the equipment was somewhat subject to recording errors or lag in indicating.

It is a primary object of the present invention to provide a compass, inclinometer combination for use in indicating the amount and direction of bore inclination at any desired point and including photographic means for recording the amount and direction of bore inclination indicated by the compass-inclinometer combination within the bore.

It is a further object to provide a compass and inclinometer unit having a common indicator card with suitable reference lines thereon so that by comparing the movement of the indicating card in relation to the reference lines of a superimposed crystal, direction and inclination may be noted by comparison to prior recorded indications of amount and slant or change in direction or inclination and the amount of difference determined.

A further object lies in support means on which the compass and inclinometer may rotate and incline freely so as to adequately and accurately indicate direction and inclination of the bore without frictional lag effects.

A further object lies in a controlled light source operable in conjunction with a prefocused camera means so that the proper amount of light is available for photographic recording.

A further object lies in a housing providing a frame protectively housing and positioning the compass-inclinometer components.

A further object lies in a compass-inclinometer indicator card which is magnetically self-aligning along the earth's North-South magnetic lines of force.

The card is photographed through a crystal to provide optic advantages in recording. By comparison between repeated photographs, changes in direction and inclination of the instruments in reference to the indicator card may be detected and measured to provide an accurate determination of the direction and inclination of the bore hole.

It is a further object of the present invention to provide a compass-inclinometer indicating and recording combination which will be relatively free from the possibility of mechanical defects, which can be readily used by a variety of operators without the requirement of specialized training, and which will provide a photographic record which may be used for technical reference purposes. We have found that the compass-inclinometer combination may be manufactured to eliminate problems inherent in other apparatus through the use of materials which are relatively free from faults of discoloration, corrosion, and warpage.

In drilling deep holes or bores, it is customary to determine with some regularity the direction and inclination of the bore to insure that the drilling is proceeding and with the inclination desired. In modern drilling procedures where the bores are often extremely deep and in some instances purposely angled from the vertical, accurate determination from the direction and inclination of the bore together with means for providing a record of successive indications of direction and inclination at various depths is necessary in order to keep the direction and inclination of the bore in the desired direction and inclination.

It is a further purpose of the present invention to provide a simple and accurate indicating device for determining the direction and inclination of a bore hole which is easy and accurate to use, economical to manufacture and assemble, readily accessible for adjustment, and compactly housed so as to be relatively safe from damage and free of malfunction while in use under field conditions.

We have found that the above objects and attributes may be obtained by housing the complete unit as a package in which the recording photographic means is in superposed relation to the indicating compass-inclinometer elements with the provision that the packaged unit has its own lighting available selectively at the time of photographic recording. Proper photographic recordation is assured through the use of a crystal in relation to the photographic means and the indicating combination to insure photographic reproductive excellence. Magnetic elements are provided to maintain a North-South relation of the unit combined with suitable reference lines, cross hairs and measured reference points to enable accurate determinations of movement to be made. The compass-inclinometer is combined in a single indicating unit pivotally supported on a non-magnetic mounting needle having a tapered bearing end movably residing a concave jeweled bearing which is supported in a fixed position within the housing.

In over simplification the indicating card is mounted on the pin which has its bearing end supported movably within a jeweled bearing. Means are provided to hold the pin and indicating card in fixed relation and movable in relationship to the jeweled bearing. Change in direction of the bore in which the unit is placed will cause a rotation of the indicating card due to the magnetic elements which are provided. Changes in the inclination of the bore will cause the counter-balanced indicating card to move to remain in a horizontal relationship. Successive photographic reproductions will show pictorially changes in the position of the indicating card. The amount and degree of change may be measured by reference to the reference points provided on the card in relation to the fixed immovable reference points of the crystal through which the indicating card is photographed.

These and other objects, advantages, and details of structure and operation will be more fully described and detailed in the accompanying description of our invention taken in conjunction with the accompanying drawings herein in which.

Figure 1:
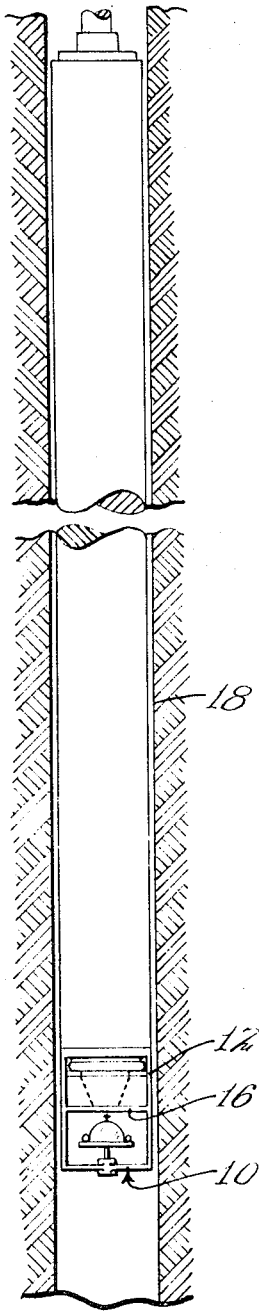
FIGURE 1 is a view in elevation of a bore hole in which the compass-inclinometer combination is suspended.

FIGURE 1 discloses a well-survey instrument generally numbered 10 including a housing 12 adapted to extend axially in a bore and including within the housing a unitary compass-inclinometer having an indicator card 14 with suitable reference indicia thereon which will be further described. In superposed relation to the compass inclinometer card 14, photographic means such as a camera is provided to photographically record changes in directional and inclinational indication by the compass-inclinometer unit taken with reference to a reference fix 16 in fixed stationary relation to the photographic means and the indicator card 14.

It will be understood that the instrument 10 is designed to be used in bores of considerable depth such as are commonly made with modern methods of drilling. It will be further understood that in drilling, it may be necessary that the bore be angled from the vertical, and it is for this purpose that the instrument is ideally suited. As the bore penetrates the earth, it is necessary that the engineer or geologist determine with some degree of frequency and with considerable accuracy the direction of the bore, and the amount of inclination of the bore.

The actual mechanics of lowering the instrument 10 into the bore hole such as 18 may be accomplished in any suitable manner. The housing 10 is lowered into the bore 18 to a predetermined depth and photographic recordation of the indicated direction and inclination is then made. As may be obvious, successive recordations will show pictorially changes in direction and inclination of the bore.

Figure 5:
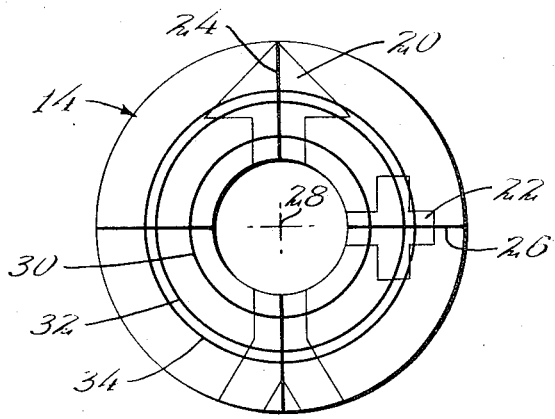
FIGURE 5 is a top plan view of the compass card with directional and inclinational reference indicia.

As may be seen in FIGURE 5, the indicator card 14 in preferred construction comprises a generally flat plate member having reference indicia on it. An arrow 20 is provided to indicate North. It is contemplated that the compass will indicate North within one degree of accuracy in normal use. At ninety degrees to the right of the arrow 20, an East mark 22 is provided. As will be further described, the card 14 is viewed with reference to a pair of perpendicular reference lines 24, 26, the line 24 being along the North-South axis, and the line 26 being along the East-West axis, and in relation to the center of axis 28 of the card, to a series of concentric circles such as 30, 32 and 34 to indicate various degrees such as for example thirty degrees, forty-five degrees, and fifty degrees.

It is obvious that sufficient reference indicia may be provided so as to enable the viewer to adequately determine accurately both direction and inclination. As would be expected the center or apex 28 of the card 14 in relation to the concentric circles represents zero degrees. It will, of course, be obvious that the reference indicia provided may be designed with a particular need in mind. For this reason, we have provided sufficient indicia to indicate the purpose of the indicator card without, however, limiting ourselves to this indicia solely.

Figure 2:
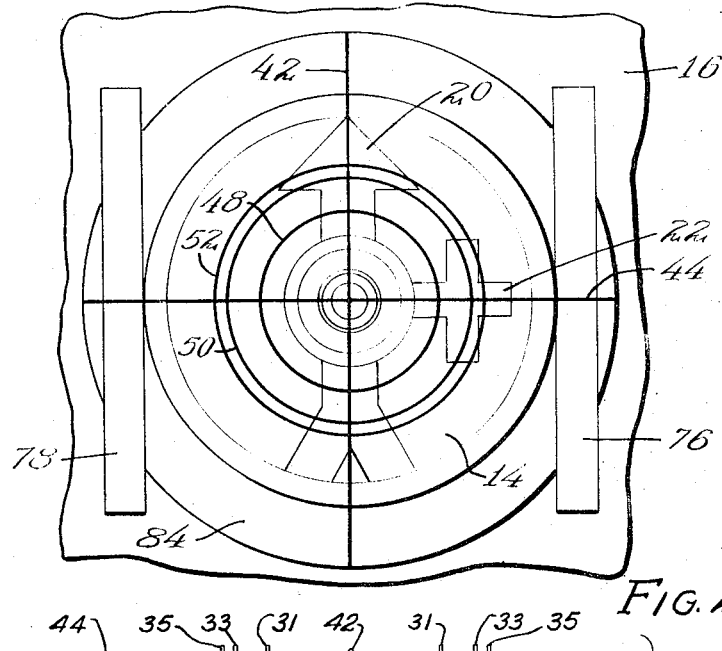
FIGURE 2 is a top plan view of the compass-inclinometer card as viewed through the crystal by the photographic means.
Figure 3:
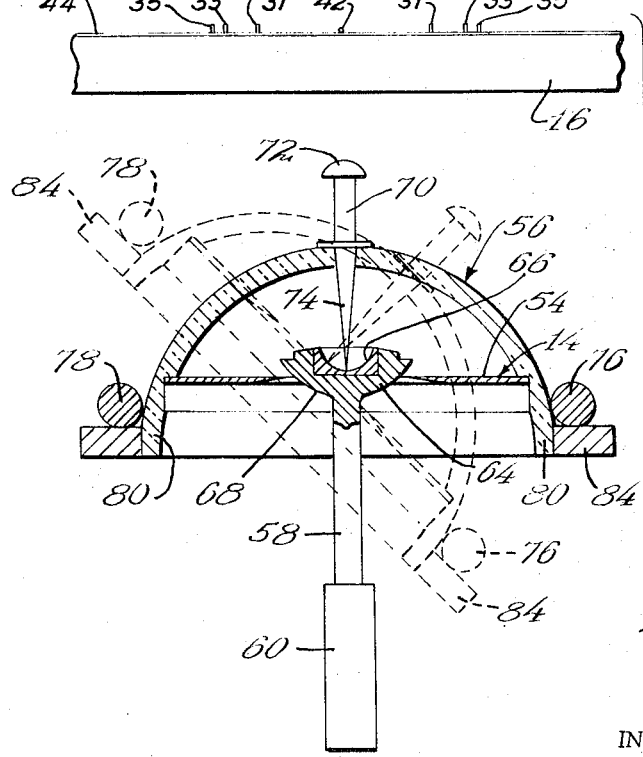
FIGURE 3 is an expanded cross section of the compass and inclinometer unit in relation to the crystal and showing the compass indicating card in two positions of indication.

As may be best seen in FIGURES 2 and 3, the indicator card 14 in preferred construction is viewed photographically with reference to a reference fix 16 which is transparent and which has suitable reference points whereby changes in indicated direction and inclination by the compass-inclinometer indicator card will be readily apparent. The reference fix 16 in preferred form is a transparent glass, which may be of glass, crystal, and the like through which photographs of the indicator card 14 may be taken. Perpendicular cross hair reference lines 42 and 44 are provided together with concentric rings which in preferred construction indicate various degrees. The rings numbered 31, 33, and 35 and represent for example respectively a thirty degree ring, a forty-five degree ring, and a fifty degree ring. Others may be provided. As will be readily apparent, movement of the indicator card 14 with reference to the fix 16 will readily indicate amount and degree of change of both direction and inclination.

As previously described and is apparent from FIGURE 1 the camera is in superposed relation to the crystal reference fix 16 which in turn is in superposed relation to the compass-inclinometer. In preferred construction, the compass inclinometer includes the indicator card 14 which has an enlarged central aperture (not shown) whereby the card 14 may be operably mounted on an upright shaft to be further described. In preferred form the card is circular and has a reference face 54; the card being engaged along its edges within a hemispherical suspension member 56. The suspension member is preferably transparent. The hollow half-ball shaped suspension member 56 is secured by any suitable means along the peripheral edge of the card 14. A hemispherical member such as a shell may be used to seal the card from foreign elements. An upright 58, including a shaft, is provided having one end 60 of the shaft 58 secured to the bottom wall 62 of the housing 12 as may be more clearly seen in FIGURE 1. The opposed end of the shaft 58 is enlarged to provide a bearing end 64 having a generally concave bearing surface 66 at its upper end. The under surface 68 is generally convex. The indicator card 14 is placed on the shaft 58, the central aperture of the card being suitably enlarged and countersunk so as to enable the card to pivot freely in relation to the convex outer surface of the enlarged bearing end of the shaft 58.

To hold the indicator card in suspended pivotal relation on the shaft 58 a pivot pin 70 is provided. The pin 70 has an enlarged head 72 and a tapered bearing end 74. In preferred construction the pin 70 is inserted through a central aperture in the shell 56 and secured to the shell by press fitting or in any other suitable manner. The tapered bearing end 74 of the pin 70 bears upon the concave jeweled bearing surface 66 to hold the card 14 in suspended relation on the shaft 58. As may be seen in the illustration, as the direction or inclination changes in the bore, the card will pivot freely to indicate the new direction or inclination with both the reference indicia of the card 14 and the enlarged pin head 72 being observable with reference to the fix 16. Inclination is measurable by observing the relation of the reference indicia of the card 14 and pin head 72 in relation to the fixed reference 16 upon change of inclination.

The pin 70 in preferred construction is preferably a stainless steel needle. The shaft 58 is preferably also of stainless steel. It will be understood that the particular materials used in the construction are chosen with the idea of providing a trouble-free low maintenance requirement for the surveying instrument, and that as more advantageous materials are produced, these may be utilized instead of the present materials.

As will be understood the indicator card 14 is held in suspended relation pivotally on the shaft 58 by the depending portions of the suspension member 56 in any suitable manner such as by use of epoxy rosin. Where an enclosing shell 56 is used, the lower inner shell periphery may be suitably grooved to accommodate the peripheral edge of the card 14 in order to provide a tight seal.

To cause the card to indicate compass direction, a pair of magnets 76 and 78 are provided in opposed relation and suitably secured near the bottom of the depending portions 80, of the shell 56 preferably to the card 14. The magnets 76 and 78 are designed to cause the indicator card 14 to be magnetically responsive to the earth's magnetism in order to insure that the inclinometer will function properly, a counterweight 84 which may be a ring as shown, or separate spaced weight members, is provided and secured to the depending portions 80 of the shell 56. Preferably the counterweights are of brass and are brought into exact balance by drilling, filing, or any suitable means.

As may be seen in the view of FIGURE 3, the indicator card 14 pivots inclinationally about the bearing end 64 of the shaft 58 in maintaining a horizontal position. FIGURE 3 in the dotted view shows the compass inclinometer in the fifty degree position. As will be apparent, the aperture in the indicator card 14 must be of sufficient size so as to permit the card to freely incline.

Figure 4:
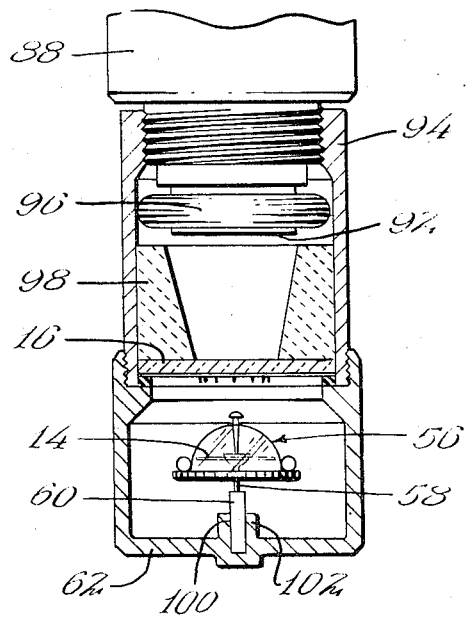
FIGURE 4 is an enlarged view of the components of the compass-inclinometer unit showing their relationship to each other in greater detail.

In the view of FIGURE 4 the various components of the compass inclinometer instrument are shown in their relationship to each other. As may be clearly seen a suitable photographic recording means such as a camera 88 is provided in superimposed relation to the crystal reference fix 16 and the transparently enclosed compass inclinometer indicator card 14. The camera 88 is provided with a lens 92 held in adjustable relation to the camera by a supporting spider 94 which is adjustable for focusing. Adjacent to the lens 92 a circular light 96 is provided to illuminate the compass inclinometer. Power is provided in the form of a power pack such as batteries, or in any other suitable manner. To focus the light upon the object a quartz cone mirror 98 is provided intermediate the lens and the crystal fix 16.

The spider 94 is adjustable toward and away from the crystal 16 to focus the lens properly. The mirror 98 as has been indicated is preferably of quartz and generally conical in shape to focus the light from the circular light 96 through the crystal 16 and the shell 56 upon the indicator card 14.

The secured end 60 of the shaft upright 58 may be secured to the bottom housing wall 62 by insertion into a socket 100 provided in the wall 62. A partially enclosing wall 102 may be provided to encircle the socket 100 to enable the shaft 58 to be removable if desired rather than permanently secured.

In actual operation of the device, the instrument 10 is lowered into the bore to the desired depth where pictures are taken of the card 14 in relation to the crystal fix 16. Successive pictures will not only indicate the change in direction, if any, of the bore, but will indicate changes in inclination of the bore as well. By comparing successive pictures the geologist or engineer may readily determine whether or not the bore is proceeding in the desired direction and with the desired degree of inclination. From the pictures, accurate calculation can be made as to whether or not the boring is proceeding as desired.

As will be apparent obvious modifications are permissible without altering the basic operation of the instrument. However, since the purpose of the illustrations is to show the interrelation of the components and to describe their function, it is not believed necessary to detail modified instruments.

The housing obviously need be completely sealed and may be insulated and cooled by any suitable means if the instrument is to be used where heat may become a factor. Inasmuch as the changes required in the housing would be obvious modifications for the particular purpose, it is not believed necessary to describe them.

In accordance with the patent office statutes we have described the best embodiments of our invention, but we desire to have it understood that obvious changes may be made within the scope of the accompanying claims without departing from the spirit of our invention.

We claim:
1. A well survey instrument including:
 (a) a housing adapted to be lowered into a bore,
 (b) an upright including a shaft in said housing having an enlarged bearing end and an end secured to said housing,
 (c) a pivot pin having a bearing end and another end pivotal on said shaft bearing end,
 (d) a generally semi-spherical transparent suspension member centrally secured on said pin intermediate said pin bearing end and said other end having depending portions,
 (e) a counterbalanced plate magnetically responsive to the earth's magnetism having opposed counterweights and magnets,
 (f) reference indicia on said plate,
 (g) said plate having a central aperture through which said shaft bearing end extends, said plate being pivotal on said shaft,
 (h) said plate secured intermediate said suspension member depending portions,
 (i) a generally transparent reference glass having reference marks in superposed relation to said plate,
 (j) camera means in superposed photographic relation to said glass and said plate,
 (k) whereby said camera photographically records changes in plate inclination and direction and direction indication in relation to said reference glass.

2. A well survey instrument including:
 (a) a housing adapted to be lowered into a bore,
 (b) an upright including a shaft in said housing having an enlarged bearing end and an end secured to said housing,
 (c) a pivot pin having a bearing end and another end pivotal on said shaft bearing end,
 (d) a generally semi-spherical transparent suspension member centrally secured on said pin having depending portions,
 (e) a counterbalanced plate having reference indicia thereon magnetically responsive to the earth's magnetism having opposed counterweights and magnets,
 (f) said plate having a central aperture through which said shaft bearing end extends, said plate being pivotal on said shaft,
 (g) said plate secured intermediate said suspension member depending portions,
 (h) a generally transparent reference glass having reference marks in superposed relation to said plate,
 (i) camera means in superposed photographic relation to said glass and said plate,
 (j) light means in illuminating relation to said plate,
 (k) means whereby said camera may be adjustably focused,
 (l) mirror means in light concentrating relation to said light means and said glass.

3. The structure of claim 2 and in which said mirror means includes a conically shaped mirror.

References Cited by the Examiner

UNITED STATES PATENTS

| | | | |
|---|---|---|---|
| 1,195,300 | 8/1916 | Wagner | 33—224 |
| 1,488,372 | 3/1924 | Andrade-Lalama | 33—222 |
| 2,338,028 | 12/1943 | Doll | 33—205.5 |
| 2,604,005 | 7/1952 | Hahn | 88—1 X |
| 2,633,645 | 4/1953 | Young | 33—205.5 |
| 3,199,210 | 8/1965 | Ledgerwood | 33—223 |

FOREIGN PATENTS 351,745   7/1931   Great Britain.

LEONARD FORMAN, *Primary Examiner.*

ISAAC LISANN, *Examiner.*

W. K. QUARLES, *Assistant Examiner.*